(12) United States Patent
Hayashi et al.

(10) Patent No.: US 10,339,615 B2
(45) Date of Patent: Jul. 2, 2019

(54) AUTOMATIC IP CORE GENERATION SYSTEM

(71) Applicants: ADAPT-IP, INC., Yokohama-shi, Kanagawa (JP); PROFOUND DESIGN TECHNOLOGY CO., LTD., Yokohama-shi, Kanagawa (JP)

(72) Inventors: Makoto Hayashi, Yokohama (JP); Yasutaka Tsukamoto, Yokohama (JP)

(73) Assignees: Makoto Hayashi, Kanagawa (JP); PROFOUND DESIGN TECHNOLOGY CO., LTD., Kanagawa (JP)

( * ) Notice: Subject to any disclaimer, the term of this patent is extended or adjusted under 35 U.S.C. 154(b) by 0 days.

(21) Appl. No.: 15/549,570

(22) PCT Filed: Jan. 18, 2016

(86) PCT No.: PCT/JP2016/051326
§ 371 (c)(1),
(2) Date: Aug. 8, 2017

(87) PCT Pub. No.: WO2016/129332
PCT Pub. Date: Aug. 18, 2016

(65) Prior Publication Data
US 2018/0040082 A1    Feb. 8, 2018

(30) Foreign Application Priority Data
Feb. 12, 2015  (JP) ................. 2015-025435

(51) Int. Cl.
*G06F 17/50*      (2006.01)
*G06Q 50/18*      (2012.01)
*G06Q 30/06*      (2012.01)

(52) U.S. Cl.
CPC ....... *G06Q 50/184* (2013.01); *G06F 17/5022* (2013.01); *G06F 17/5045* (2013.01); *G06Q 30/0603* (2013.01)

(58) Field of Classification Search
CPC .......................... G06Q 50/184; H02J 17/5022; H02J 17/5045; H02J 17/505; H02J 2217/66
(Continued)

(56) References Cited

U.S. PATENT DOCUMENTS

2003/0014729 A1    1/2003  Makoto
2010/0318946 A1*  12/2010  Hamilton ............ G06F 17/5045
                                                 716/104

FOREIGN PATENT DOCUMENTS

JP    2000123061 A2    4/2000
JP    2001222567 A2    8/2001
(Continued)

OTHER PUBLICATIONS

International Search Report dated Apr. 19, 2016 filed in PCT/JP2016/051326.
(Continued)

*Primary Examiner* — Paul Dinh
(74) *Attorney, Agent, or Firm* — Rankin, Hill & Clark LLP

(57) ABSTRACT

The present invention is to provide an automatic IP core generation system that can reduce the loads on both an IP core vendor and a user. The present invention provides an automatic IP core generation system that generates an IP core in accordance with parameter information input from a user. The automatic IP core generation system includes: a parameter acquisition unit that acquires the parameter information; a meta IP core information storage unit that stores a meta IP core model as a model for generating various IP cores; a component library information storage unit that
(Continued)

stores a component to be used in the IP core and the meta IP core model; an IP core generation unit that generates a package containing the IP core in accordance with the parameter information; and a package output unit that outputs the package.

11 Claims, 7 Drawing Sheets

(58) Field of Classification Search
USPC .......................................................... 716/104
See application file for complete search history.

(56) References Cited

FOREIGN PATENT DOCUMENTS

| | | |
|---|---|---|
| JP | 2001312611 A2 | 11/2001 |
| JP | 2006004313 A2 | 1/2006 |

OTHER PUBLICATIONS

Takemoto, "Introductory edition—What is RTL?", Design Wage Magazine, No. 17, 1998, pp. 156-157, and its English translation.
Wakabayashi, "C-based Behavioral Synthesis and Verification—Analysis on Industrial Design Examples", NEC Corp., Conference Paper, Jan. 2004.
Coussy et al., "An Instruction to High-Level Synthesis", High-Level Synthesis, Jul./Aug. 2009, pp. 8-17.

* cited by examiner

AUTOMATIC IP CORE GENERATION SYSTEM

TECHNICAL FIELD

The present invention relates to a system for providing IP cores, and, more particularly, to a system for automatically generating an IP core in accordance with a request from a user.

BACKGROUND ART

In conventional large-scale integration (LSI) development, a technique of using functional blocks of designed circuits is adopted to shorten the design time and lower the development costs and the like. Circuits on such functional block basis are called IPs (Intellectual Properties) or IP cores, and are sold to users from IP core vendors that develop and provide those IP cores.

According to one method of selling such IP cores, an IP core vendor publishes a catalog of IP cores the IP core vendor can provide, and a user reads the catalog to purchase an IP core he/she needs. This method is a catalog sales method.

For example, Patent Literature 1 discloses a technology relating to a system that examines an IP core developed by an IP provider, registers the IP core in a catalog database, and evaluates the IP core, so as to intermediate an electronic transaction between the IP core vendor and a user who is to purchase the IP core.

According to another method of selling IP cores, users present required specifications to an IP core vendor, and, in accordance with the required specifications, the IP core vendor develops IP cores with specifications suited for the respective users. This method is a made-to-order sales method.

CITATION LIST

Patent Literature
  Patent Literature 1: JP 2001-312611 A

SUMMARY OF INVENTION

Technical Problem

Where IP cores are sold by a catalog sales method as disclosed in Patent Literature 1, a user can promptly purchase an IP core in a catalog published by an IP core vendor. However, it is necessary for the IP core vendor to develop various IP cores to be shown in the catalog, resulting in high development costs. Since there is no guarantee that all the IP cores in the catalog will be purchased, the risk of generating no profits is high. From the user's point of view, it is possible to purchase only the IP cores shown in the catalog. Therefore, if any IP core does not perfectly meet a desired specification, it is necessary to design an IP core that makes up for the deficiency. As a result, the effect of the use of an IP core to reduce development costs becomes smaller.

By a made-to-order IP core sales method, a user can be provided with an IP core as desired. However, the IP core vendor needs to develop IP cores for respective users, resulting in high development costs. Since each IP core is developed after an order is placed by a user, a long time is required before a delivery, and the effect of the use of an IP core to shorten the design time becomes smaller. Furthermore, to guarantee the quality of IP cores, there is a need to prepare a test bench or the like for each IP core ordered by users, and it is not easy to guarantee the quality. There is also a need to provide an after-sales care for each IP core, and therefore, higher costs than those for IP core sales by a catalog sales method are required.

In view of the above, the present invention is to provide an automatic IP core generation system that can reduce the loads on both an IP core vendor and a user.

Solution to Problem

To solve the above problem, an automatic IP core generation system according to the present invention is an automatic IP core generation system that generates an IP core in accordance with parameter information input from a user, and characteristically includes:

a parameter acquisition unit that acquires the parameter information;
  a meta IP core information storage unit that stores a meta IP core model as a model for generating various IP cores;
  a component library information storage unit that stores a component to be used in the IP core and the meta IP core model;
  an IP core generation unit that generates a package containing the IP core using the meta IP core model and the component, in accordance with the parameter information; and
  a package output unit that outputs the package.

Using this system, a user can promptly obtain an IP core with a desired specification, without an IP core vendor manually developing an IP core each time.

In a preferred mode of the present invention, the IP core generation unit characteristically includes a report creation unit that creates a performance report on the IP core, and the system further includes a report output unit that outputs the performance report.

In this mode, a user can check if an IP core has capability as expected, before purchasing the IP core.

In a preferred mode of the present invention, the IP core generation unit characteristically includes a model generation unit that generates a behavior level IP core from the meta IP core model and the component, in accordance with the parameter information.

In this mode, a user can be provided with a behavior level IP core, and use the behavior level IP core in generating a register transfer level IP core having a different operating frequency or the like after the purchase.

In a preferred mode of the present invention, the IP core generation unit characteristically includes a high-level synthesis unit that generates a register transfer level IP core in accordance with the parameter information.

In this mode, a user can be provided with a register transfer level IP core. Accordingly, even a user not having a high-level synthesis means for generating a register transfer level IP core from a behavior level IP core can use an IP core automatically generated according to the present invention.

In a preferred mode of the present invention, the IP core generation unit characteristically includes a logic synthesis unit that generates a netlist form IP core by performing logic synthesis of the register transfer level IP core, in accordance with the parameter information.

In this mode, a user can be provided with a netlist form IP core. Accordingly, a user can use an IP core automatically generated according to the present invention, without converting a behavior level IP core into a register transfer level IP core through high-level synthesis, and converting the register transfer level IP core into a netlist form IP core through logic synthesis.

In a preferred mode of the present invention, the automatic IP core generation system characteristically further includes a web input/output unit that provides the user with an input receiving screen for the parameter information, and transfers the parameter information input from the user to the parameter acquisition unit.

In this mode, a user can use the automatic IP core generation system according to the present invention via a network.

In a preferred mode of the present invention, the automatic IP core generation system characteristically further includes:
 a package information storage unit that stores the package; and
 a package management unit that acquires the package from the package information storage unit, when the package information storage unit stores the package including an IP core satisfying the specification specified by the parameter information.

In this mode, a package containing an IP core with a specification expected to be demanded by a large number of users is stored into the package information storage unit in advance, and the package is provided to a user when there is a request from the user. Thus, the process to be performed by the IP core generation unit to generate the same package more than once can be eliminated.

In a preferred mode of the present invention, the package management unit characteristically records the package generated by the IP core generation unit, into the package information storage unit.

In this mode, a package generated by the IP core generation unit is stored in the package information storage unit, and the process of generating the package can be skipped when provision of an IP core with the same specification is again requested.

A method of operating an automatic IP core generation system according to the present invention is a method of operating an automatic IP core generation system that generates an IP core is accordance with parameter information input from a user with respect to IP core generation,
 the automatic IP core generation system including a parameter acquisition unit, an IP core generation unit, a package output unit, a meta IP core information storage unit storing a meta IP core model as a model for generating various IP cores, and a component library information storage unit storing a component to be used in the IP core and the meta IP core model,
 the IP core generation unit including a model generation unit and a high-level synthesis unit.

The method characteristically includes:
a step of acquiring an input of the parameter information from the user, the input being acquired by the parameter acquisition unit;
a step of generating an IP core package by using the meta IP core model and the component in accordance with the parameter information, the IP core package being generated by the IP core generation unit; and
a step of outputting the IP core package, the IP core package being output by the package output unit.

The step of generating the IP core package characteristically includes: a step of generating a behavior level IP core from the meta IP core model and the component in accordance with the parameter information, the behavior level IP core being generated by the model generation unit; and a step of generating a register transfer level IP core by performing high-level synthesis of the behavior level IP core in accordance with the parameter information, the register transfer level IP core being generated by the high-level synthesis unit.

A method of operating an automatic IP core generation system according to the present invention is a method of operating an automatic IP core generation system that generates an IP core in accordance with parameter information input from a user with respect to IP core generation,
 the automatic IP core generation system including a parameter acquisition unit, an IP core generation unit, a report output unit, a package output unit, a meta IP core information storage unit storing a meta IP core model as a model for generating various IP cores, and a component library information storage unit storing a component to be used in the IP core and the meta IP core model,
 the IP core generation unit including a model generation unit and a high-level synthesis unit.

The method characteristically includes:
a step of acquiring an input of the parameter information from the user, the input being acquired by the parameter acquisition unit;
a step of generating an IP core package using the meta IP core model and the component in accordance with the parameter information, the IP core package being generated by the IP core generation unit;
a step of outputting a performance report accompanying the IP core package in accordance with the parameter information, the performance report being output by the report output unit; and
a step of outputting the IP core package, the IP core package being output by the package output unit.

The step of generating the IP core package characteristically includes:
a step of generating a behavior level IP core from the meta IP core model and the component in accordance with the parameter information, the behavior level IP core being generated by the model generation unit; and a step of generating a register transfer level IP core by performing high-level synthesis of the behavior level IP core in accordance with the parameter information, the register transfer level IP core being generated by the high-level synthesis unit.

An IP core is automatically generated in accordance with a parameter input from a user, and the IP core with the specification desired by the user is provided. Thus, the loads on the IP core vendor and the user can be reduced.

DESCRIPTION OF EMBODIMENTS

First Embodiment

A first embodiment of the present invention will be described below in detail with reference to the accompanying drawings.

Figure 1:
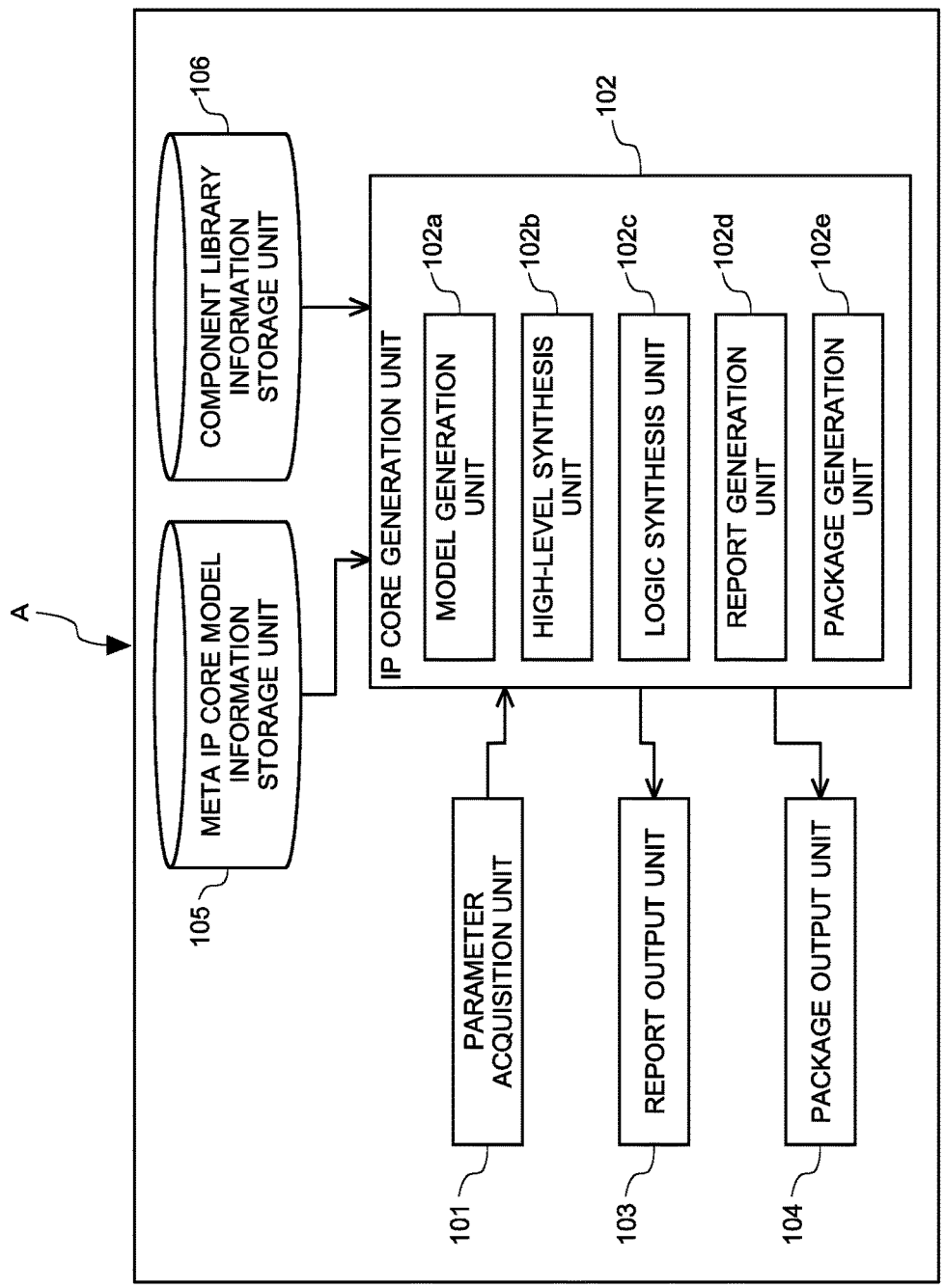
FIG. 1 is a functional block diagram of an automatic IP core generation system according to a first embodiment of the present invention.

FIG. 1 is a functional block diagram of an automatic IP core generation system A according to this embodiment.

The automatic IP core generation system A includes: a parameter acquisition unit 101 that acquires a parameter input relating to the specification of a desired IP core from the user who wishes to purchase the IP core; an IP core generation unit 102 that generates the IP core in accordance with the acquired parameters; a report output unit 103 that outputs a performance report on the generated IP core; a package output unit 104 that outputs an IP core package including the IP core, the performance report, verification environments, and the like; a meta IP core model information storage unit 105 that stores the meta IP core model to be used by the IP core generation unit 102 to generate the IP core; and a component library information storage unit 106 that stores the component library to be used by the IP core generation unit 102 to generate the IP core.

Here, the meta IP core model s a model prepared for generating an IP core in accordance with parameters input by the user, and is written in a programming language such as C, C++, or SystemC, or a modeling language such as UML or a user-defined language. The meta IP core model includes a model written in a language such as C language for generating a high-speed simulation model to be used in performing an IP core simulation, and a model for conducting IP core implementation.

The component library is implementation of functions, an interface, and module components, which are used for IP cores and the meta IP core model. Like the meta IP core model, the component library includes a model for generating a high-speed simulation model, and a model for conducting IP core implementation. In a specific example, the component library includes interface protocols such as P2P and a bus protocol, implementation of mathematical functions such as floating points and fixed points, and basic hardware components such as a shift register and a line buffer.

The IP core generation unit 102 further includes a model generation unit 102a, a high-level synthesis unit 102b, a logic synthesis unit 102c, a report generation unit 102d, and a package generation unit 102e.

In accordance with the parameters input by the user, the model generation unit 102a generates a behavior level IP core expressed in a language such as SystemC from the meta IP core model and the component library.

In accordance with the parameters input by the user, the high-level synthesis unit 102b performs high-level synthesis of the behavior level IP core, to generate a register transfer level (RTL) IP core.

In accordance with the parameters input by the user, the logic synthesis unit 102c performs logic synthesis of the register transfer level IP core, to generate a netlist form IP core at the gate level or the transistor level.

The report generation unit 102d generates a performance report for presenting various kinds of performance of the generated IP core to the user.

The package generation unit 102e generates a package for providing the user with the generated IP core. The package includes implementation of one or more IP cores desired by the user among the behavior level IP core, the register transfer level IP core, and the netlist form IP core, the specification of the IP core, the performance report on the IP core, the verification environments for conducting behavior verification of the IP core, and a model written in a language such as C language for performing a high-speed simulation on the IP core. The package further includes a high-level synthesis script containing the parameters to be used in performing high-level synthesis in a case where the user wishes to be provided with a behavior level IP core, and a logic synthesis script containing the parameters to be used in performing logic synthesis in a case where the user wishes to be provided with a register transfer level IP core and a netlist form IP core.

It should be noted that the verification environments are implemented in SystemC or one of various hardware description languages or the like, and are designed to provide inputs/outputs to/from a generated IP core. In a case where the IP core is to be used for data conversion or the like, data for verification may also be provided. As the verification environments are also included in the package to be provided to the user as described above, the user can verify each IP core generated by the automatic IP core generation system A.

The automatic IP core generation system A is embodied by adding the above described various units and storage units to a general computer that includes an arithmetic device, a main storage, an auxiliary storage, and various input/output devices. More specifically, the automatic IP core generation system A can be embodied by installing one or more programs for causing a computer device to function as the above described units into the auxiliary storage of the computer device, securing the area to be used as the respective storage units, loading the program(s) into the main storage, and then performing processing with the arithmetic device. Alternatively, the automatic IP core generation system A may be embodied as a configuration involving two or more computer devices, such as a configuration that has only the IP core generation unit 102 included in a different computer device from the other units, or a configuration that has the meta IP core model information storage unit 105 and the component library information storage unit 106 included in another computer device.

Figure 2:
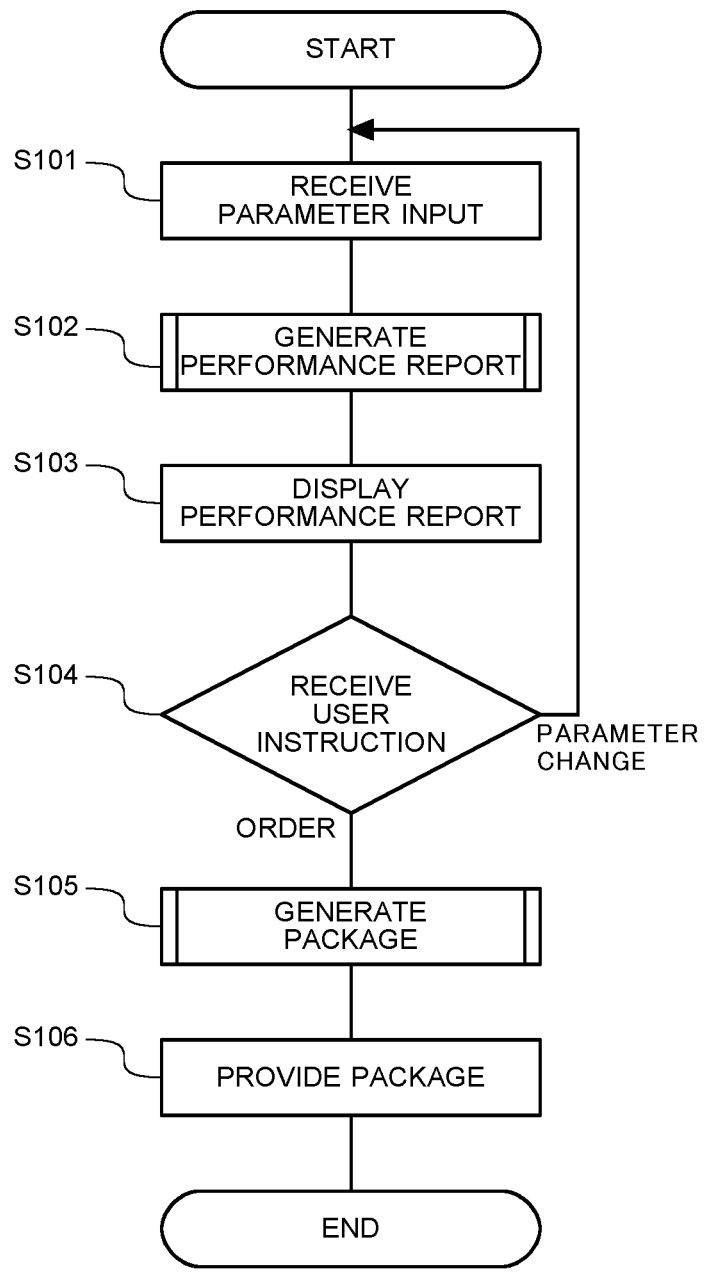
FIG. 2 is a flowchart showing a package provision process according to the first embodiment of the present invention.

Next, a method of using the automatic IP core generation system A is described. FIG. 2 is a flowchart showing the flow in a process to be performed to provide a user with an IP core through the automatic IP core generation system A.

First, in step S101, an input of parameters relating to a desired IP core is received from a user. The parameters include the form of the IP core the user wishes to be provided with among the behavior level, the register transfer level, and the netlist form, the details of processing to be performed on the IP core, such as an encoding process and an image conversion process, the operating frequency for the IP core, the type and the semiconductor process of the chip in which the IP core is to be implemented, the interface to be used, and the limit on the number of processing cycles. Here, the parameters accepted as an input should include those necessary for generating the IP core. In a case where the user wishes to be provided with an IP core at the register transfer level or in the netlist form, for example, the input parameters need to include the operating frequency for the IP core. In a case where the user wishes to be provided with a behavior level IP core, however, an input of the operating frequency can be skipped, because the behavior level IP core does not depend on the operating frequency.

An input of the parameters may be received by any method using any appropriate means, such as a means of displaying an input screen in the form of a list or a wizard, or a means of receiving an input of a file in which the parameters are written in a predetermined format.

Figure 3:
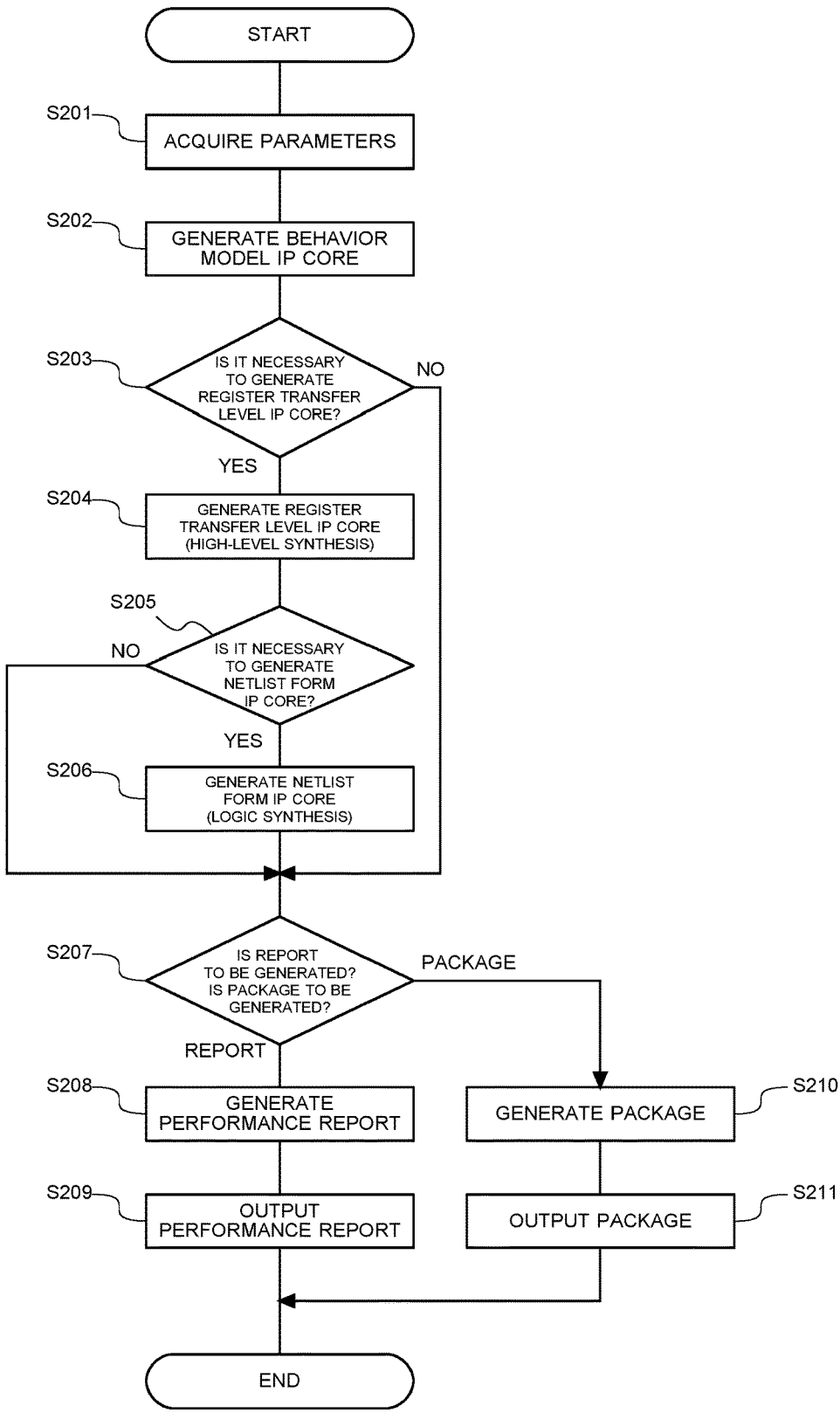
FIG. 3 is a flowchart showing a performance report/package generation process according to the first embodiment of the present invention.

In step S102, a report generation process using the input parameters is performed. FIG. 3 is a flowchart showing a performance report/package generation process to be performed the IP core generation unit 102. First, in step S201, the parameters already received as an input are acquired.

In step S202, the necessary information about the meta IP core model and the component library is acquired from the meta IP core model information storage unit 105 and the component library information storage unit 106 in accordance with the parameters, and a behavior level IP core is generated by the model generation unit 102a.

In step S203, a check is made to determine whether there is a need to generate a register transfer level IP core. In a case where the parameters snow that the user wishes to be provided with only a behavior level IP core, for example, there is no need to generate a register transfer level IP core.

If it is determined in step S203 that there is necessary to generate a register transfer level IP core, the process moves on to step S204. In step S204, high-level synthesis is performed on the behavior level IP core by the high-level synthesis unit 102b using the necessary information such as the operating frequency included in the parameters, and thus, a register transfer level IP core is generated.

In step S205, a check is made to determine, from the parameters and the like, whether there is a need to generate a netlist form IP core. If it is necessary to generate a netlist form IP core, the process moves on to step S206. In step S206, logic synthesis is performed on the register transfer level IP core by the logic synthesis unit 102c in accordance with the parameters, and a netlist form IP core at a gate level or a transistor level is generated.

After the IP core in the necessary form is generated through the above described process, a check is made to determine, in step S207, whether the necessary process is to generate a performance report or whether the necessary process is to generate a package. As generation of a performance report is desired here, the process moves on to step S208, and a performance report on the generated IP core is generated. In step S209, the performance report is output, and the process returns to that shown in FIG. 2.

After the performance report is generated in step S102 through the above described process, display is performed to present the performance report to the user in step S103. Here, like the parameter input receiving method in step S101, the display may be performed by any appropriate method us ng a screen display means separately prepared or a file output means separately prepared.

As well as the performance report, the specification of the IP core may be presented to the user. In this manner, the user can receive more detailed information as to the IP core.

After the performance report is presented to the user, an instruction from the user is received in step S104. By referring to the performance report, the user determines whether the generated IP core satisfies the requirements as expected. If the user determines that a parameter change is necessary, he/she issues an instruction to that effect. If a parameter change instruction is issued from the user, the respective procedures from the parameter input in step S101 to the performance report display in step S103 are again carried out. As this process is repeated, the user can issue an instruction for generation of an IP core that matches his/her expectations.

If an IP core order instruction is received from the user in step S104, a package to be provided to the user is generated in step S105. Referring now back to the flowchart in FIG. 3, explanation is made.

First, the respective procedures in steps S201 through S206 are carried out, to generate an IP core in the necessary form, as in the above described performance report generation process. Package generation is selected in step S207, and the process then moves on to step S210.

In the package generation process in step S210, implementation of an IP core in one or more forms desired by the user, the specification of the IP core, a performance report on the IP core, the verification environments for the IP core, a high-speed simulation model, a high-level synthesis script, a logic synthesis script, and the like are generated as described above. Of these elements in the package, the elements required by the user may be included in the parameters, or element designations may be received from the user at the time of package generation. In this manner, the elements required by the user are acquired, and only these required elements may be included in the package.

The generated package is output in step S211, and the process then returns to that shown in FIG. 2.

After the package generation process in step S105 is ended, the package is provided in step S106. Thus, the process of providing the user with an IP core is completed. It should be noted that the package may be provided by any appropriate method, such as outputting a file or recording the package into a recording medium such as an optical medium.

The process to be performed by the automatic IP core generation system A to provide a user with an IP core may include the step of calculating the fee in accordance with the form of the IP core to be provided and the contents of the package, and demanding payment from the user. Since the automatic IP core generation system A is designed to be able to provide a user with an IP core in one or more forms among the three forms of a behavior level, a register transfer level, and a netlist form, the automatic IP core generation system A is preferably capable of changing the fee in accordance with the form of the IP core to be provided to the user.

Alternatively, only users who have paid advance fees based on conditions such as durations and frequencies of use may be allowed to use the automatic IP core generation system A, for example. In this manner, payment may be received from users in different manners.

As described above, using the automatic IP core generation system A, a user can designate parameters, adjust the parameters while checking a performance report, and receive a necessary IP core in the form of a package containing the specification, the verification environments, and the like.

Meanwhile, an IP core vendor does not need to develop IP cores in accordance with requests from respective users. Thus, each IP core vendor can provide an IP core to a user more quickly and at lower costs than with a conventional system such as a made-to-order system.

Second Embodiment

A second embodiment of the present invention will be described below in detail with reference to the accompanying drawings. In this embodiment, the same components as those of the first embodiment are basically denoted by the same reference numerals as those used in the first embodiment, and explanation thereof will be only briefly made.

Figure 4:
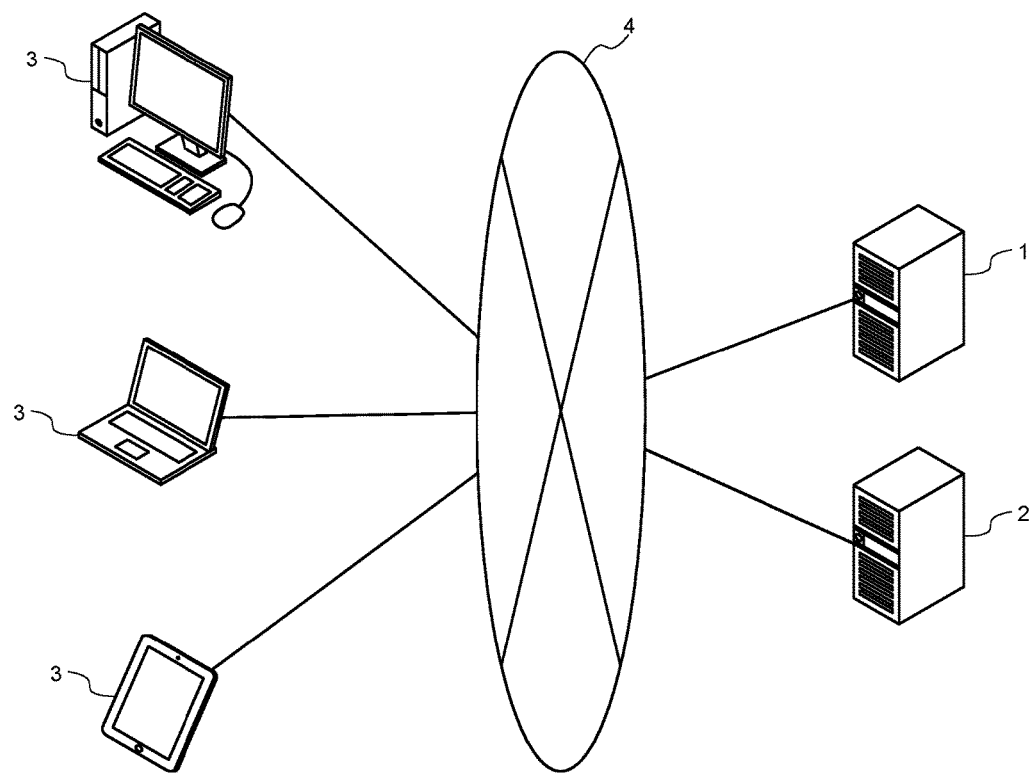
FIG. 4 is a configuration diagram of an automatic IP core generation system according to a second embodiment of the present invention.

FIG. 4 is a system configuration diagram of an automatic IP core generation system B according to this embodiment. In the automatic IP core generation system B, an IP core generation server device 1, a web server device 2, and user terminal devices 3 are designed to be able to communicate with one another via a network 4.

Figure 5:
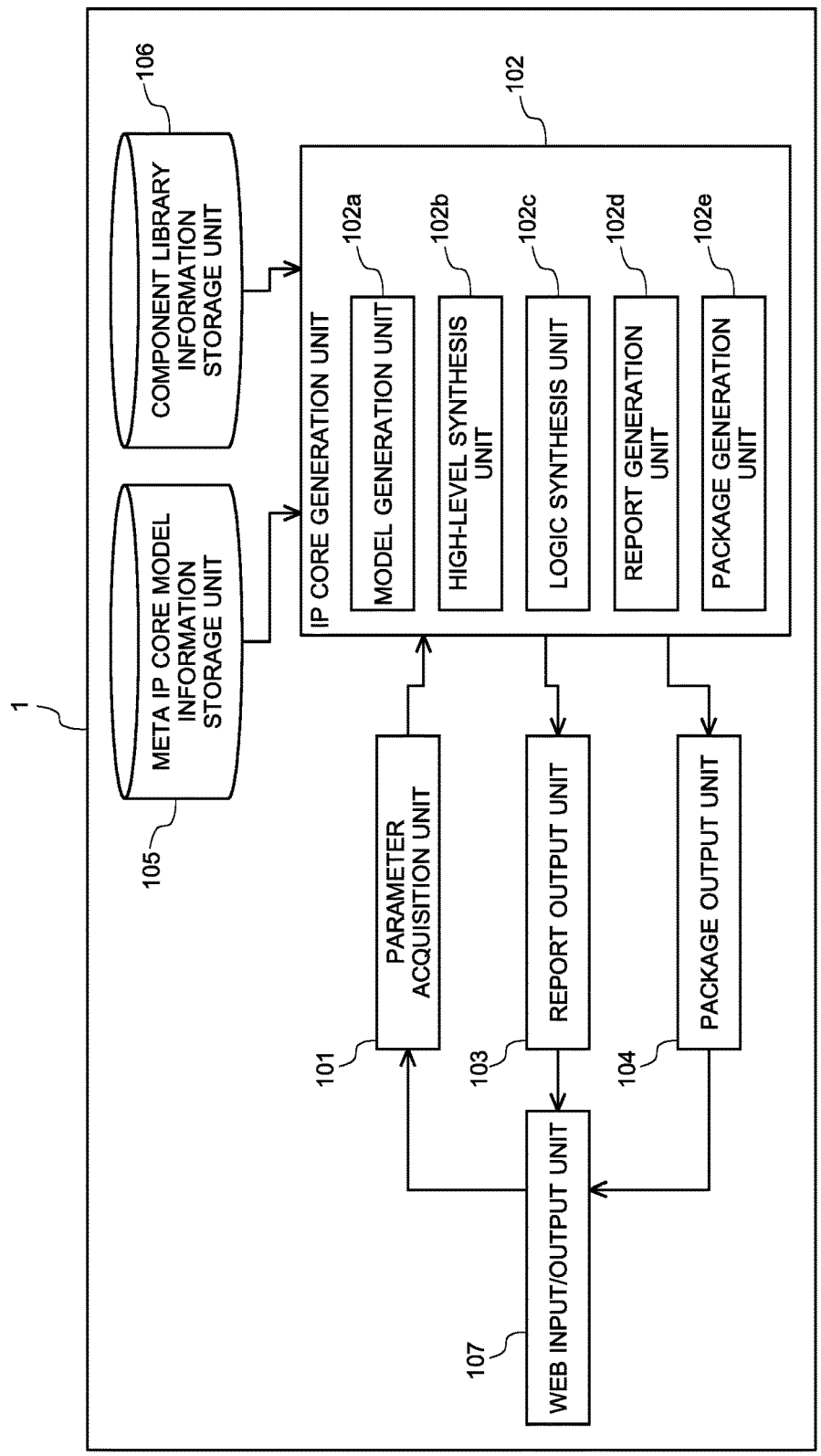
FIG. 5 is a functional block diagram of the automatic IP core generation system according to the second embodiment of the present invention.

As shown in a functional block diagram in FIG. 5, the IP core generation server device 1 includes a parameter acquisition unit 101, an IP core generation unit 102, a report output unit 103, a package output unit 104, a meta IP core model information storage unit 105, and a component library information storage unit 106, like the automatic IP core generation system A of the first embodiment. In addition to the above, the IP core generation server device includes a web input/output unit 107 that performs inputting/outputting to/from the web server device 2.

The web server device 2 provides a web site for receiving an input of parameters relating to IP core generation from a user, outputting a performance report on the generated IP core, outputting a generated package, and the like.

The user then performs operations such as inputting the parameters, viewing the performance report, and downloading the package, using general browser software or the like installed in a user terminal device 3.

It should be noted that the IP core generation server device 1 and the web server device 2 are formed with general server devices each including an arithmetic device, a main storage, an auxiliary storage, and various input/output devices. More specifically, each of the IP core generation server device 1 and the web server device 2 can be embodied by installing one or more programs for causing a server device to function as the above described units into the auxiliary storage of the server device, securing the area to be used as the respective storage units, loading the program(s) into the main storage, and then performing processing with the arithmetic device. Alternatively, the IP core generation server device 1 may be divided into server devices by function, or the IP core generation server device 1 and the web server device 2 may be formed with a single server device.

Each user terminal device 3 may be a general computer device including an arithmetic device, a main storage, an auxiliary storage, and various input/output devices, a tablet, a smartphone, or the like. Each user terminal device 3 has a general web browser software for communicating with the web server device 2 and performing operations such as inputting the parameters, viewing the performance report, and downloading the package. Alternatively, each user terminal device 3 may have a special program for communicating with the web server device 2, instead of a web browser software.

A method of use with the automatic IP core generation system B is the same as the method described in the first embodiment with reference to the flowcharts shown in FIGS. 2 and 3. However, the parameter input in step S101 and the parameter change or order instruction in step S104 are received through an operation of the browser software installed in the corresponding user terminal device 3. The performance report display in step S103 and the package provision in step S106 are also conducted through the browser software installed in the user terminal device 3.

As described above, inputting/outputting to/from the IP core generation server device 1 is performed with the web server device 2 and the user terminal devices 3 via the network 4. Thus, a larger number of users can use the automatic IP core generation system B.

In this embodiment, the process of providing a user with an IP core also preferably includes the step of calculating the fee and demanding payment from the user, as in the first embodiment. Further, it is also preferable to take measures to receive payment from users. For example, only users who have paid advance fees are allowed to use the automatic IP core generation system B.

A user information storage unit is preferably prepared separately so that authentication is required to use the automatic IP core generation system B. With such a configuration, it is possible to manage the above described payment relating to IP cores prod by the automatic IP core generation system B, for example.

Third Embodiment

A third embodiment of the present invention will be described below in detail with reference to the accompanying drawings. In this embodiment, the same components as those of the first embodiment are basically denoted by the same reference numerals as those used in the first embodiment, and explanation thereof will be only briefly made.

Figure 6:
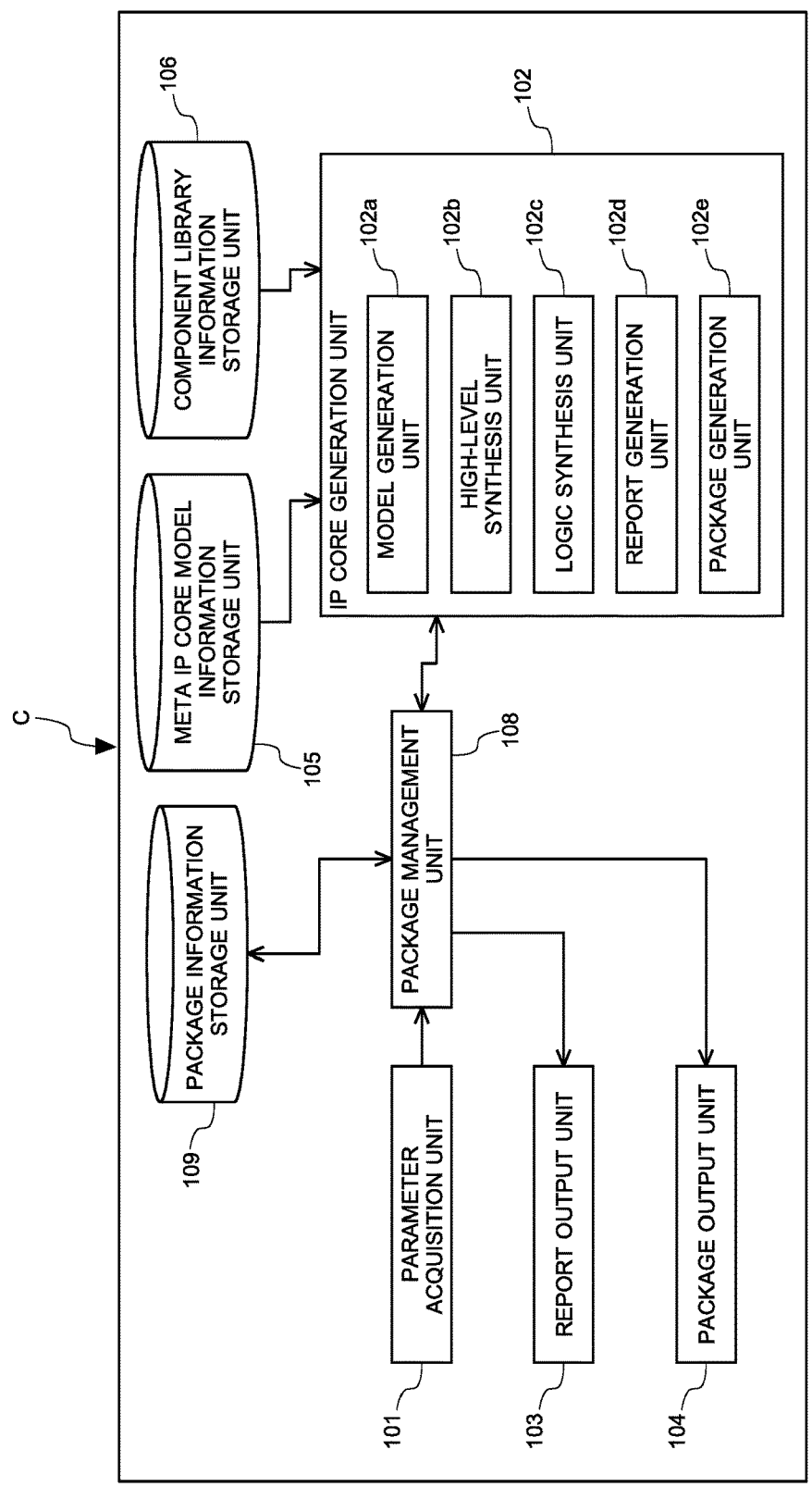
FIG. 6 is a functional block diagram of an automatic IP core generation system according to a third embodiment of the present invention.

As shown in a functional block diagram in FIG. 6, an automatic IP core generation system C according to this embodiment includes a parameter acquisition unit 101, an IP core generation unit 102, a report output unit 103, a package output unit 104, a meta IP core model information storage unit 105, and a component library information storage unit 106, like the automatic IP core generation system A of the first embodiment. In addition to the above, the automatic IP core generation system C includes a package information storage unit 109 that stores information about generated packages, and a package management unit 108 that manages the package information.

Figure 7:
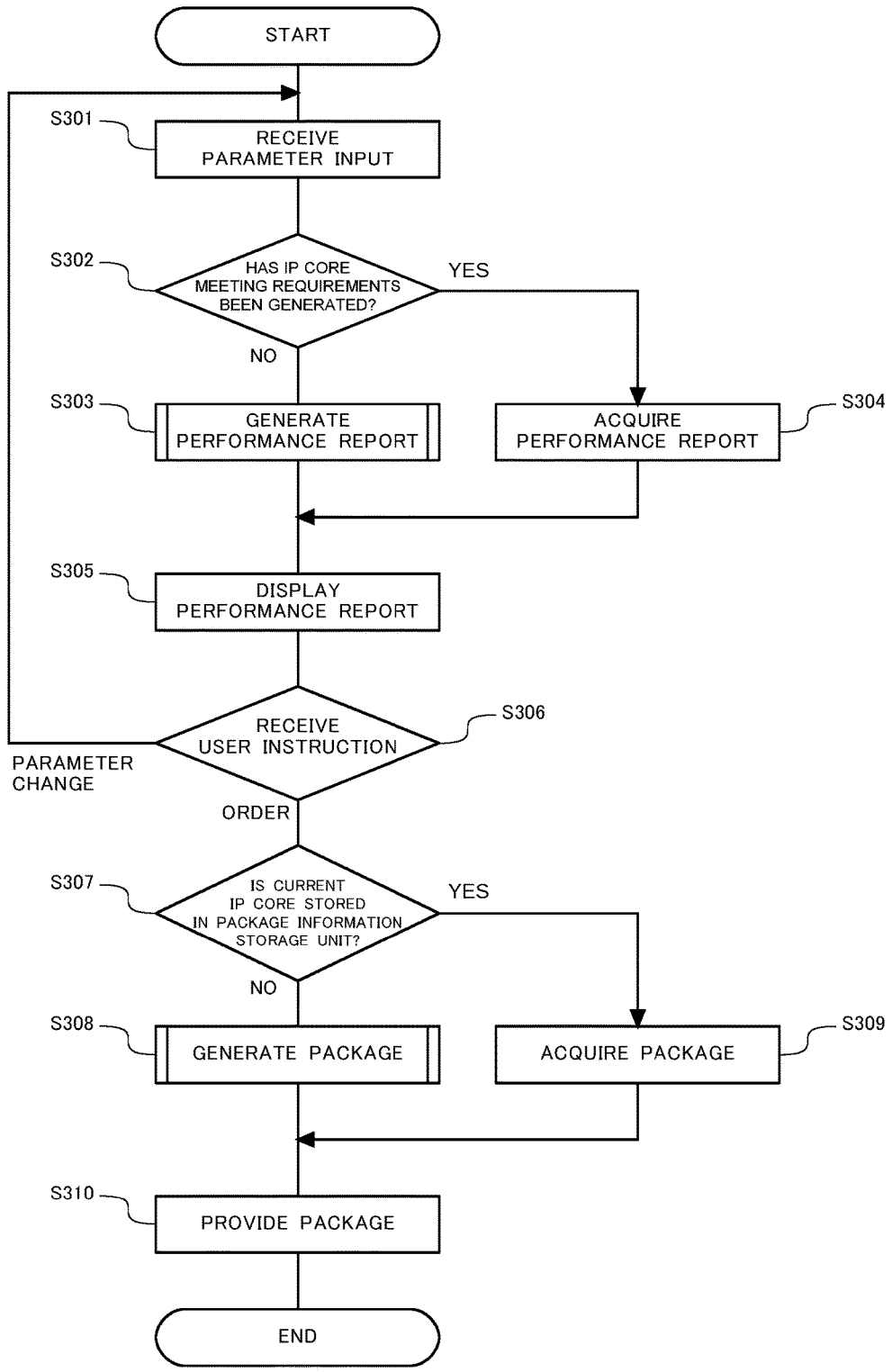
FIG. 7 is a flowchart showing a package provision process according to the third embodiment of the present invention.

FIG. 7 is a flowchart showing the flow in a process to be performed to provide a user with an IP core through the automatic IP core generation system C. First, in step S301, an input of parameters relating to IP core generation is received from a user by an appropriate means, as in step S101 described in the first embodiment with reference to FIG. 2.

In step S302, a check is made to determine, from the parameters input from the user, whether any of the packages stored in the package information storage unit 109 includes an IP core that meets the user's requirements. If it is determined that the package information storage unit 109 does not store such a package, a performance report is created in step S303 through the process described with reference to FIG. 3, as in step S102.

If it is determined in step S302 that the package information storage unit 109 stores a package that meets the user's requirements, on the other hand, the process moves on to step S304, in which the performance report contained in the package is acquired from the package information storage unit 109.

In step S305, the performance report is presented to the user through an appropriate means, as in step S103. In step S306, a parameter change or order instruction is received, as in step S104. If a parameter change instruction is received here, the procedures in steps S301 through S305 are repeated.

If an order instruction is received in step S306, the process moves on to step S307, in which a check is made to determine whether the ordered package is a package stored in the package information storage unit 109. That is, a check is made to determine whether the performance report presented to the user in step S305, which has been carried out immediately before step S306, is the performance report generated in step S303, or the performance report presented to the user in step S305 is the performance report acquired from the package information storage unit 109 in step S304.

If the package is determined not to be a package stored in the package information storage unit 109, the process moves on to step S308, a package is generated through the process shown in FIG. 3, as in step S105.

If the package is determined to be a package stored in the package information storage unit 109, on the other hand, information about the package is acquired from the package information storage unit 109 in step S309.

In step S310, the package is provided to the user by an appropriate method, as in step S106. The process then comes to an end.

As described above, in a case where the IP core desired by a user is an IP core contained in a package stored in the package information storage unit 109, the process of generating the package can be skipped with the use of the automatic IP core generation system C according to this embodiment. Thus, processing time and resources can be greatly reduced.

It should be noted that the package information storage unit 109 may be designed to store packages with specifications expected to be demanded by users, or may store packages generated in steps S303 and S308. Particularly, in the automatic IP core generation system C with the latter configuration, information about a generated package is accumulated every time a user uses the automatic IP core generation system C. Thus, an extremely high efficiency can be achieved.

In this embodiment, the IP core desired by a user is acquired only when the IP core is stored in the package information storage unit 109. However, only part of the package that is stored in the package information storage unit 109 may be allowed for use.

In an example case, a user wishes to be provided with an IP core at a register transfer level or in a netlist form, and the package information storage unit 109 stores a package that contains an IP core that differs from the IP core desired by the user only in the specification and the operating frequency, and also contains a behavior level IP core. A behavior level IP core is an IP core in a form that does not depend on the operating frequency. Accordingly, in this case, the behavior level IP core contained in the package is acquired, and high-level synthesis is performed with the use of parameters such as an operating frequency input from the user. In this manner, the process of generating a behavior level IP core can be skipped.

Like the automatic IP core generation system B according to the second embodiment, the automatic IP core generation system C according to this embodiment may include a web server device 2 so that a user can operate the automatic IP core generation system C through a user terminal device 3.

In this embodiment, the process of providing a user with an IP core also preferably includes the step of calculating the fee and demanding payment from the user, as in the first and second embodiments. Further, it is also preferable to take measures to receive payment from users. For example, only users who have paid advance fees are allowed to use the automatic IP core generation system C.

REFERENCE SIGNS LIST

A, B, C Automatic IP core generation system
101 Parameter acquisition unit
102 IP core generation unit
102a Model generation unit
102b High-level synthesis unit
102c Logic synthesis unit
102d Report generation unit
102e Package generation unit
103 Report output unit
104 Package output unit
105 Meta IP core model information storage unit
106 Component library information storage unit
107 Web input/output unit
108 Package management unit
109 Package information storage unit
1 IP core generation server device
2 Web server device
3 User terminal device
4 Network

The invention claimed is:

1. An automatic IP core generation system that generates an IP core in accordance with parameter information input from a user,
the automatic IP core generation system comprising:
a parameter acquisition unit configured to acquire the parameter information;
a meta IP core information storage unit configured to store a meta IP core model as a model for generating various IP cores;
a component library information storage unit configured to store a component to be used in the IP core and the meta IP core model;
an IP core generation unit configured to generate a package containing the IP core by using the meta IP core model and the component, in accordance with the parameter information; and
a package output unit configured to output the package,
wherein the IP core generation unit includes:
a model generation unit configured to generate a behavior level IP core from the meta IP core model and the component, in accordance with the parameter information; and
a high-level synthesis unit configured to generate a register transfer level IP core by performing high-level synthesis of the behavior level IP core, in accordance with the parameter information,
the package output by the package output unit includes implementation of one or more IP cores desired by the user among at least the behavior level IP core and the register transfer level IP core generated by the IP core generation unit, and
in response to the generated package satisfying specification requirement specified by the parameter information, the automatic IP core generation system provides the generated package for subsequent design development and manufacturing semiconductor devices.

2. The automatic IP core generation system according to claim 1, wherein
the IP core generation unit includes a report creation unit configured to create a performance report on the IP core, and
the automatic IP core generation system further comprises a report output unit configured to output the performance report.

3. The automatic IP core generation system according to claim 1, wherein the IP core generation unit includes a logic synthesis unit configured to generate a netlist form IP core by performing logic synthesis of the register transfer level IP core, in accordance with the parameter information, and the package output by the package output unit includes implementation of one or more IP cores desired by the user among the behavior level IP core, the register transfer level IP core and the netlist form IP core generated by the IP core generation unit.

4. The automatic IP core generation system according to claim 1, further comprising a web input/output unit configured to provide the user with an input receiving screen for the parameter information, and transfer the parameter information input from the user to the parameter acquisition unit.

5. The automatic IP core generation system according to claim 1, further comprising:

a package information storage unit configured to store the package; and a package management unit configured to acquire the package from the package information storage unit, when the package information storage unit stores the package including an IP core satisfying a specification specified by the parameter information, wherein the package output unit outputs the package acquired from the package information storage unit when the package information storage unit stores the IP core satisfying the specification specified by the parameter information.

6. The automatic IP core generation system according to claim 5, wherein the package management unit records the package generated by the IP core generation unit, into the package information storage unit.

7. A method of operating an automatic IP core generation system that generates an IP core in accordance with parameter information input from a user with respect to IP core generation, the automatic IP core generation system including a parameter acquisition unit, an IP core generation unit, a package output unit, a meta IP core information storage unit storing a meta IP core model as a model for generating various IP cores, and a component library information storage unit storing a component to be used in the IP core and the meta IP core model, the IP core generation unit including a model generation unit and a high-level synthesis unit, the method comprising:

a step of acquiring an input of the parameter information from the user, the input being acquired by the parameter acquisition unit;

a step of generating an IP core package by using the meta IP core model and the component in accordance with the parameter information, the IP core package being generated by the IP core generation unit; and a step of outputting the IP core package, the IP core package being output by the package output unit, wherein the step of generating the IP core package includes: a step of generating a behavior level IP core from the meta IP core model and the component in accordance with the parameter information, the behavior level IP core being generated by the model generation unit; and a step of generating a register transfer level IP core by performing high-level synthesis of the behavior level IP core in accordance with the parameter information, the register transfer level IP core being generated by the high-level synthesis unit, the IP core package output in the step of outputting the IP core package includes implementation of one or more IP cores desired by the user among at least the behavior level IP core and the register transfer level IP core generated in the step of generating the IP core package, and the method further comprises, in response to the generated IP core package satisfying specification requirement specified by the parameter information from the user, providing the generated IP core package for subsequent design development and manufacturing semiconductor devices.

8. A method of operating an automatic IP core generation system that generates an IP core in accordance with parameter information input from a user with respect to IP core generation, the automatic IP core generation system including a parameter acquisition unit, an IP core generation unit, a report output unit, a package output unit, a meta IP core information storage unit storing a meta IP core model as a model for generating various IP cores, and a component library information storage unit storing a component to be used in the IP core and the meta IP core model, the IP core generation unit including a model generation unit and a high-level synthesis unit, the method comprising:

a step of acquiring an input of the parameter information from the user, the input being acquired by the parameter acquisition unit;

a step of generating an IP core package using the meta IP core model and the component in accordance with the parameter information, the IP core package being generated by the IP core generation unit;

a step of outputting a performance report accompanying the IP core package in accordance with the parameter information, the performance report being output by the report output unit; and a step of outputting the IP core package, the IP core package being output by the package output unit, wherein the step of generating the IP core package includes: a step of generating a behavior level IP core from the meta IP core model and the component in accordance with the parameter information, the behavior level IP core being generated by the model generation unit; and a step of generating a register transfer level IP core by performing high-level synthesis of the behavior level IP core in accordance with the parameter information, the register transfer level IP core being generated by the high-level synthesis unit, the IP core package output in the step of outputting the IP core package includes implementation of one or more IP cores desired by the user among at least the behavior level IP core and the register transfer level IP core generated in the step of generating the IP core package, and the method further comprises, in response to the generated IP core package satisfying specification requirement specified by the parameter information from the user, providing the generated IP core package for subsequent design development and manufacturing semiconductor devices.

9. The automatic IP core generation system according to claim 1, wherein the package further includes a high-level synthesis script containing the parameter information to be used in performing the high-level synthesis in a case where the user wishes to be provided with the behavior level IP core.

10. The method according to claim 7, wherein the IP core package further includes a high-level synthesis script containing the parameter information to be used in performing the high-level synthesis in a case where the user wishes to be provided with the behavior level IP core.

11. The method according to claim 8, wherein the IP core package further includes a high-level synthesis script containing the parameter information to be used in performing the high-level synthesis in a case where the user wishes to be provided with the behavior level IP core.

* * * * *